W. E. KAWALLE.
SELF PROPELLED VEHICLE.
APPLICATION FILED SEPT. 2, 1916.
1,231,377.
Patented June 26, 1917.
2 SHEETS—SHEET 1.
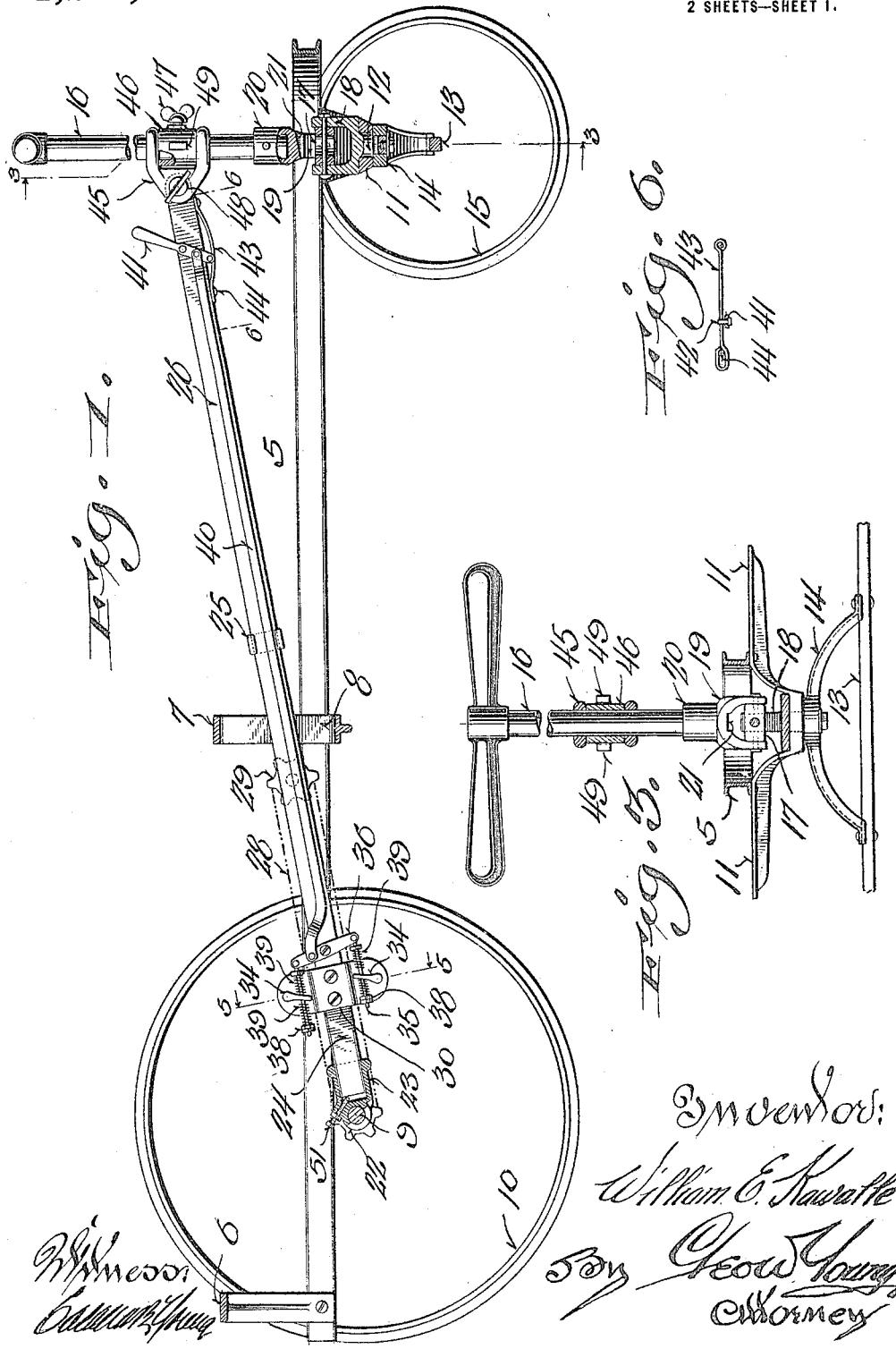

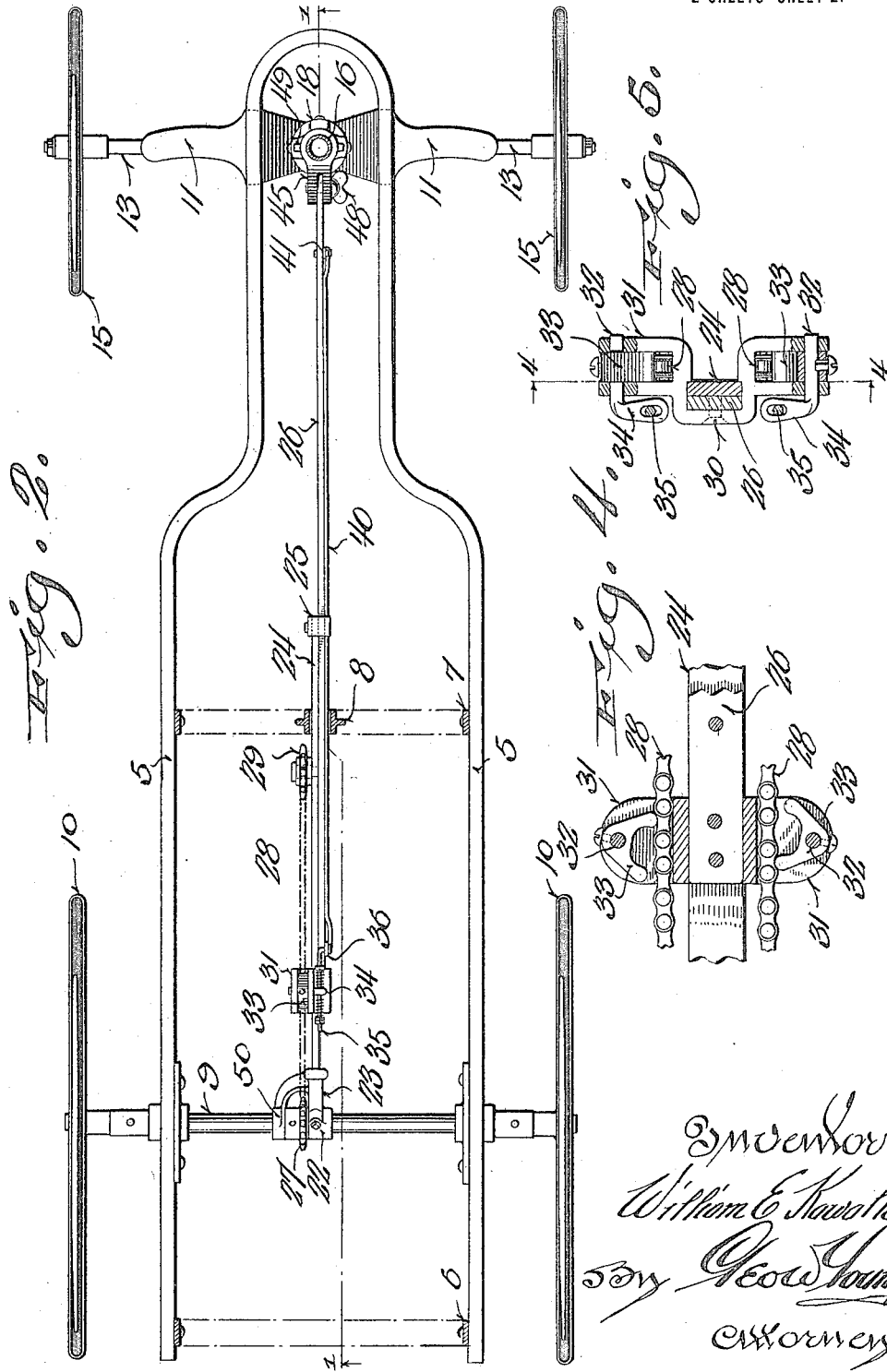

UNITED STATES PATENT OFFICE.

WILLIAM E. KAWALLE, OF MANITOWOC, WISCONSIN.

SELF-PROPELLED VEHICLE.

1,231,377.  Specification of Letters Patent.  Patented June 26, 1917.

Application filed September 2, 1916. Serial No. 118,196.

*To all whom it may concern:*

Be it known that I, WILLIAM E. KAWALLE, a citizen of the United States, and resident of Manitowoc, in the county of Manitowoc and State of Wisconsin, have invented certain new and useful Improvements in Self-Propelled Vehicles; and I do hereby declare that the following is a full, clear, and exact description thereof.

The present invention relates to new and useful improvements in manually propelled vehicles, more particularly of that smaller type whereon a person is adapted to sit, and to propel the vehicle by rocking a suitable operating lever.

It is in general the object of the present invention to simplify and otherwise improve the structure, and to increase the efficiency of devices of this character, and although this type of vehicle is used largely as a child's toy, I find that it is susceptible of use in various practical connections, particularly with respect to transporting relatively small loads in rural districts. It is therefore further the object of the invention to provide a vehicle which is particularly adapted for such practical uses.

More specifically, an important object of the invention is to provide a driving arrangement wherein no dead center occurs in any position thereof, in contradistinction to the present structures, whereby the ready starting of the vehicle is assured, and further whereby the difficulty experienced in getting past the dead center, particularly when the vehicle is climbing a hill, is eliminated.

A further object resides in the provision of an operating lever for the drive mechanism of the vehicle, which also serves as a steering column of the vehicle, whereby the vehicle may be simultaneously propelled and steered.

A still further important object resides in the provision of an arrangement wherein the leverage exerted by the operating lever may be varied, to thus lessen the strain of operation under adverse conditions, as in climbing a hill.

A still further object resides in the provision of a detachable connection between the combined drive operating and steering lever and the drive mechanism, whereby said lever may if desired be utilized as a draft tongue for the vehicle.

A still further object resides in the provision of an exceedingly simple and efficient drive mechanism embodying the foregoing advantages.

A further object in connection with the drive mechanism resides in the provision of a reversing arrangement for the drive mechanism which may be most readily manipulated for actuation in either direction.

A still further object in connection with the drive mechanism resides in the provision of a clutch connection between the drive axle and the operating levers, which is releasable upon independent rotative movement of the drive axle to permit coasting of the vehicle.

With the above and other objects and advantages in view, the invention resides more particularly in the novel combination, arrangement and formation of parts more particularly hereinafter described and particularly pointed out in the appended claims.

In the drawings

Figure 1 is a central vertical sectional view of a manually propelled vehicle constructed in accordance with the present invention, and as indicated by the line 1—1 of Fig. 2.

Fig. 2 is a plan view of the improved vehicle, the seat portion thereof being removed.

Fig. 3 is a vertical sectional view taken transversely through the steering and operating lever portions of the vehicle, as indicated by the line 3—3 of Fig. 1.

Fig. 4 is a vertical sectional view through the clutch portion of the drive mechanism, as indicated by the line 4—4 of Fig. 5.

Fig. 5 is a transverse view through the clutch portion, as indicated by the line 5—5 of Fig. 1.

Fig. 6 is a detail sectional view of the holding spring for the reverse mechanism, as indicated by the line 6—6 of Fig. 1.

Referring now more particularly to the accompanying drawings, the frame of the improved vehicle comprises a pair of side sills 5 having their forward ends inwardly offset to provide clearances for the feet of the operator, and preferably integrally connected at their extremities. The rear ends of the side sills are connected by depending legs of a rear cross sill 6 adapted to support the rear end of the seat of the vehicle (not shown), and for supporting the front end of the seat a similar intermediate cross sill 7 has its depending ends secured to the side sills, the seat being thus held in spaced relation above the frame. This intermediate cross sill 7 carries a central depending loop 8 in which the drive mechanism is movable. Journally carried by the rear portions of the side sills 5 is the rear drive axle 9, on which is mounted wheels 10. Secured transversely to the inwardly offset forward portions of the side sills 5, adjacent their extremities, is a transverse bar 11 which has its ends extending laterally of the forward sill portions to form foot rests and which has its intermediate portion downwardly offset. Mounted in this downwardly offset portion is a pivot shaft 12 which is connected with the front axle 13 of the vehicle through the medium of an upwardly arched bar 14 having its ends secured to the front axle and provided centrally with a squared aperture receiving the squared lower extremity of the pivot shaft. The front axle carries wheels 15 which are preferably considerably smaller than the rear drive wheels 10.

To provide a combined steering and drive operating means, an upstanding lever 16 is universally pivoted to the pivot shaft 12, this pivotal connection preferably comprising a universal pivot block 17 disposed between and pivoted to upwardly extending spaced arms 18 on the pivot shaft 12, and spaced arms 19 depending from the lower portion of the lever, this lower portion in the present instance comprising a socket member 20 receiving the main shank portion of the lever. A drive mechanism for the rear axle is connected with the lever above its pivot, and when it is desired to utilize the lever simply as a draft tongue for the vehicle, the drive mechanism is disconnected, and the lever swung forwardly to a normal position for this function. To relieve strain upon the universal connection, when the lever is used as a draft tongue, the lower socket portion 20 of the lever is provided in its inner end with a recess 21 receiving the forward upstanding arm 18 of the pivot shaft 12, whereby the strain of operation is thus transmitted directly from the lever to the pivot shaft.

The drive mechanism comprises a sleeve 22 journaled on the central portion of the rear axle 9, and carrying a lateral socket portion 23 in which is engaged one end of a bar 24 which extends therefrom forwardly through the loop 8 of the intermediate cross sill 7 and is slidably connected at its forward end, preferably by the embracing clip 25, with a bar 26 which extends also through the loop 8. Fixed on the rear axle 9 at the outer side of the bar 24 is a sprocket wheel 27 around which is trained a sprocket chain 28 also trained about an idle sprocket wheel 29 on the bar 24, this sprocket chain, as shown, being preferably of that conventional type employed in bicycles, and having depressions between the pivotal connections of its links. Fixed to the rear end of the bar 26 is a head block 30 which slidably receives the rod 24, whereby the rods are held at two points in sliding contact, and this block is preferably of U shape, with its legs extending between and forming bearings for the inner sides of the stretches of the chain 28. Pairs of arms 31 extend outwardly from the head block to embrace the chain stretches, and fixedly mounted on transverse shafts 32 journaled in the ends of these arms are V-shaped pawls 33, the legs of which are adapted to selectively engage in the depressions of the links of the chain 28, to bind said links against the head block, whereby movement of the corresponding stretch of the chain will be procured by movement of the head block.

To selectively urge opposite legs of the pawls into engagement with the chain stretches, whereby reciprocation of the head block will effect a continuous rotation of the chain, the ends of the pawl carrying shafts 32 are provided at one side of the head with inwardly extending arms 34 through which are loosely passed shafts 35 pivotally connected to the ends of a lever 36 which is centrally pivoted to the bar 26. The end portions of the shafts carry adjusting nuts 38 and disposed on the shafts between the adjusting nuts and the arms 34 are expansile springs 39. Thus by rocking the lever 36, the springs at opposite ends of the shafts 35 will engage the arms of the pawl-carrying shafts 32, to rock the pawls thereof in opposite directions, and to procure this rocking movement of the lever 36, a link 40 is secured thereto and extends forwardly along the bar 26, for pivotal connection with an intermediately pivoted reverse lever 41 adjacent its forward end. This lever is held against pivotal movement, to thus hold the lever 36 in desired rocked positions, by engagement of a laterally extending pin 42 at its lower end with a leaf spring 43 secured at one end to the bar 26, and having its other end loosely connected with the bar by the pin and slot connection 44.

Thus an exceedingly simple reversible drive connection is provided between the operating lever 16 and the rear axle.

Inasmuch as no dead center exists in the present drive connection, difficulty in starting the vehicle is eliminated, and a more positive operation is assured under adverse conditions, as in climbing a hill.

For connecting the bar 26 to the lever, a connecting knuckle 45 is provided having spaced arms slidably mounted on the shank of the lever, and disposed between these arms is a collar 46 adapted for fixed securement to the lever by means of a set screw 47. The forward end of the lever is engaged between furcations of the knuckle and pivotally secured by the removable bolt 48, to permit detachment of the lever when using the lever as a draft tongue, in which instance the bar 26 and the drive mechanism carried thereby would drop and rest in the loop 8.

To prevent excessive turning movement of the operating lever 16, in steering the vehicle, a pair of outwardly extending diametrically opposed lugs 49 are carried by the collar 46 and adapted to abut the knuckle 45.

Under various conditions of work, it is desired to vary the leverage exerted by the operator, and this may be readily accomplished by sliding the collar 46 on the shank of the operating lever, to thus increase or reduce the actuation of the drive means.

It is seen that the disposition of the bars 24 and 26 in the guide loop 8, serves to prevent lateral swinging movement of the operating lever, whereby it is at all times held for maximum efficiency in actuating the drive mechanism. The drive mechanism is also held against lateral movement by an angular sleeve arm 50 projecting from the sprocket portion 23 of the sleeve 22 to embrace the fixed sprocket wheel 27 on the rear axle shaft. Tension adjustment of the sprocket chain 28 is procured by means of a screw 51 which extends diagonally into the socket member 23 and abuts the end of the bar 24.

In addition to the elimination of a dead center, the present clutch arrangement afforded by the pawls and chain, which forms a ratchet drive, permits independent rotation of the drive axle to permit coasting of the vehicle without necessitating reciprocation of the operating lever, thus leaving said lever free to perform its steering function.

The entire structure thus set up, is of maximum simplicity, to such extent that it may be commercially employed as a child's toy, yet the various features and advantages of the structure adapt it for more practical uses, particularly in conveying relatively small loads in rural districts.

While I have shown one form of my invention, more particularly adapted for the purposes just set forth, it is obvious that various features of the invention may be employed in other connections, and it is to be understood that the scope of the invention is therefore limited only by the scope of the appended claims.

I claim:

1. A manually propelled vehicle comprising a wheeled frame including a drive axle, a pivoted operating lever, bars pivotally attached to the axle and lever respectively and slidably connected and a ratchet drive mechanism for said axle carried by said bars and movable with the lever connected bar.

2. A manually propelled vehicle comprising a wheeled frame including a pivoted front axle structure, a drive mechanism, a combined steering and drive lever, a universal joint connection between said lever and the front axle, a detachable connection between said lever and the drive mechanism and means for procuring an interlocking relation of portions of the lever and front axle structure upon detachment of the drive mechanism connection, whereby to relieve strain from the universal joint when the lever is used as a draft tongue.

3. A manually propelled vehicle comprising a wheeled frame including a front axle, a pivot shaft fixedly connected with the front axle, spaced arms at the upper end of said pivot shaft, a universal joint block pivoted between said arms, a combined drive and steering lever, spaced arms at the lower end of the lever pivoted to the universal joint block, a drive mechanism, a detachable connection between the lever and drive mechanism and the lever being provided with a recess adapted to interlockingly receive an arm of the pivot shaft.

4. A manually propelled vehicle comprising a pivoted front axle, a drive mechanism, a combined steering and drive lever connected with the pivoted front axle, a collar longitudinally adjustable on the lever, a knuckle having arms journaled on the lever at the sides of the collar, and a link pivotally connected with the knuckle and connected with the drive mechanism.

5. A manually propelled vehicle comprising a pivoted front axle, a drive mechanism, a combined steering and drive lever connected with the pivoted front axle, a collar longitudinally adjustable on the lever, a knuckle having arms journaled on the lever at the sides of the collar, a link pivotally connected with the knuckle and connected with the drive mechanism, and projecting lugs on the sleeve adapted to abut the knuckle to limit steering movement of the lever.

6. A manually propelled vehicle comprising a wheeled frame including a drive axle, a bar extending laterally from the axle, a sprocket wheel on the axle, an idle sprocket wheel on the bar, a chain trained about both wheels, a slidable bar slidably connected with the first bar and supported at its outer end, a clutch carried by said bars and movable with the second bar and including a portion adapted to grippingly engage the chain in one direction of movement, and means for reciprocating the said second bar.

7. A manually propelled vehicle comprising a wheeled frame including a drive axle, a pivoted operating lever, a bar pivoted to the drive axle, a bar pivoted to the lever, said bars being slidably connected, a sprocket wheel fixed on the drive axle, an idle sprocket wheel on the first named bar, a chain trained about said wheels and a clutch member carried by said bars and movable with the second named bar and including a portion grippingly engageable with the chain in one direction of movement.

8. A manually propelled vehicle comprising a wheeled frame including a drive axle and a pivoted front axle, a combined steering and drive lever, a universal joint connection between said lever and the front axle, a bar pivoted to the drive axle, a bar pivoted to the lever, a sliding connection between said bars, a ratchet drive mechanism for the drive axle carried by said bars and movable with the lever connected bar and a guide loop for said bars carried by the frame.

9. A manually propelled vehicle comprising a wheeled frame including a drive axle, a sprocket wheel on the axle, a bar extending laterally from the axle, an idle sprocket wheel on the bar, a chain trained about both wheels, a second bar slidably connected with the first bar and supported at its outer end, a clutch carried by said bars and movable with the second bar and including a portion adapted to engage the chain in either direction of movement and means for reversing said clutch member comprising a lever pivoted to the second named bar and a link extending from said second lever and connected with said clutch member for controlling the selective engagement of said portion thereof with the chain.

10. A manually propelled vehicle comprising a wheeled frame including a drive axle, a pivoted operating lever, a bar pivoted to the drive axle, a bar connected with the operating member, a sliding connection for said bars, a sprocket wheel fixed on the drive axle, a sprocket wheel idly mounted on the first named bar, a sprocket chain trained about said wheel, a clutch member movable with the second named bar and including a portion grippingly engageable with the chain selectively in either direction of movement, and means for reversing said clutch member comprising a second lever pivoted to the second named bar and a link extending from said second lever and connected with said clutch member for controlling the selective engagement of said portion thereof with the chain.

11. A drive mechanism comprising a drive shaft, a bar extending laterally from the drive shaft, a second bar slidably connected with the first bar, a sprocket wheel on the drive axle, an idle sprocket wheel on the first bar, a chain trained about said wheels, a clutch member movable with the inner end of the second bar and including a portion adapted to grippingly engage the chain in one direction of movement and means for reciprocating the second bar.

12. A drive mechanism comprising a drive shaft, a sprocket wheel on the drive shaft, a bar extending laterally from the drive shaft, a second bar slidably connected with the first bar, an idle sprocket wheel on the first bar, a chain trained about both wheels, a clutch member carried by said bars and movable with the second bar and including a portion grippingly engageable with the chain in either direction of movement; means for reciprocating the second named bar and means for controlling the engagement of said clutch portion with the chain comprising a lever pivoted to the second named bar and a link extending from said lever and connected with the clutch portion.

13. A drive mechanism comprising a drive shaft, a sprocket wheel on the drive shaft, an idle sprocket wheel remote therefrom, a chain trained about both wheels, a clutch member movable adjacent the chain and including a body member, a V-shaped pawl pivotally carried thereby and selectively resiliently urged to engage either of its sides in gripping relation with the chain.

14. A drive mechanism comprising a drive shaft, a sprocket wheel on the drive shaft, an idle sprocket wheel remote therefrom, a chain trained about both wheels, a clutch member movable adjacent the chain and including a body member, a shaft pivoted to the body member, a V-shaped pawl on the shaft, a lateral arm on the shaft, a shiftable shaft disposed transversely of the said lateral arm, springs on the arm and means for shifting the said shiftable shaft to selectively engage either of said springs with the arm to rock the pawl for selective engagement of one of its arms with the chain.

15. A drive mechanism comprising a drive shaft, a sprocket wheel on the drive shaft, an idle sprocket wheel remote therefrom, a chain trained about both wheels, a clutch member movable adjacent the chain and including a body member, a pair of shafts carried by the body member, V-shaped pawls on the pair of shafts, lateral arms on the shafts, an intermediately pivoted lever movable with the clutch member, shafts pivoted to the lever and extending transversely of the said lateral arms of the first shafts, springs on the second shafts at the sides of the arms and means for shifting the said lever to selectively engage opposite springs with the arms to rock the pawls for engagement of opposite arms thereof with corresponding stretches of the chain.

16. A drive mechanism comprising a drive shaft, a bar extending laterally from the drive shaft, a second bar slidably connected with the first bar, a sprocket wheel on the drive shaft, an idle sprocket wheel on the first bar, a chain trained about said wheel, a clutch member movable with the inner end of the second bar and including a body member, a shaft carried by the body member, a V-shaped pawl on the shaft, a lateral arm on the shaft, a shiftable shaft disposed transversely of the said lateral arm, springs on the shiftable shaft at the sides of the arm, a lever pivoted to the second bar and to the shiftable shaft, a second lever pivoted to the outer end of the second bar and a link connecting said levers.

17. A manually propelled vehicle comprising a wheeled frame including a drive axle, a sprocket wheel on the axle, a bar extending laterally from the axle, an idle sprocket wheel on the bar, a chain trained about both wheels, a second bar slidably connected with the first bar and supported at its outer end, a clutch carried by said bars and movable with the second bar and including a portion adapted to engage the chain in either direction of movement and means for selectively controlling the engagement of said clutch portion with the chain to procure propelling rotation of said chain in either direction.

In testimony that I claim the foregoing I have hereunto set my hand at Milwaukee, in the county of Milwaukee and State of Wisconsin.

WILLIAM E. KAWALLE.

Copies of this patent may be obtained for five cents each, by addressing the "Commissioner of Patents, Washington, D. C."